Nov 2, 1937.  H. S. BAMFORD  2,097,994
INCANDESCENT SCREEN
Filed Aug. 18, 1936
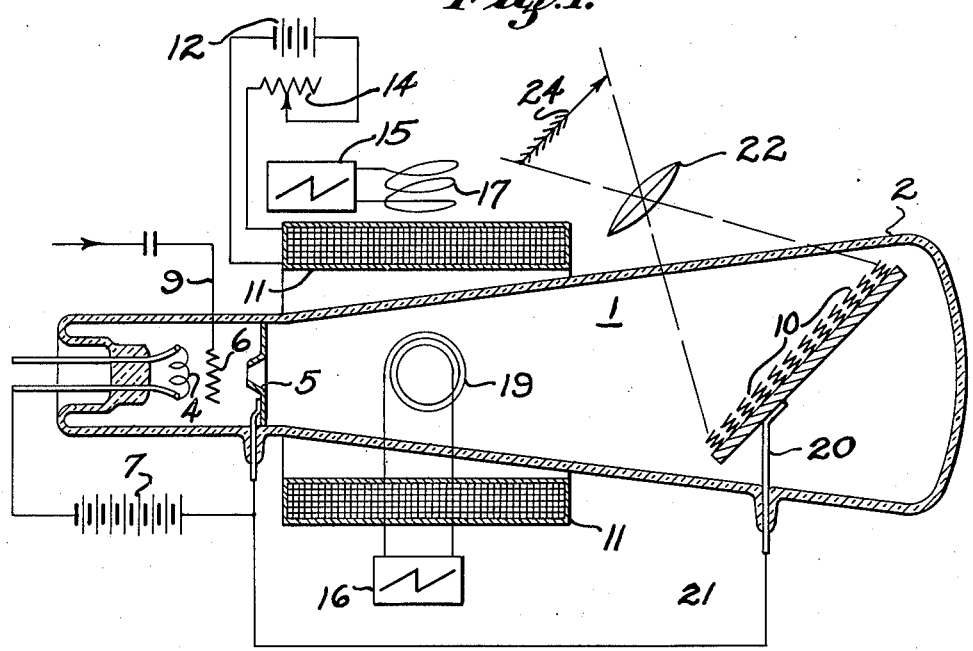
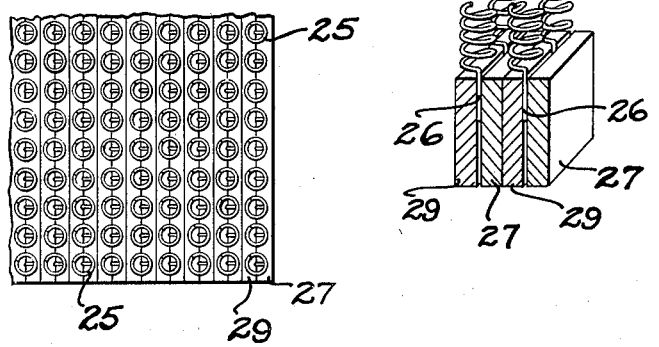
INVENTOR.
HARRY S. BAMFORD
BY
Lippincott & Metcalf
ATTORNEYS.

Patented Nov. 2, 1937

2,097,994

UNITED STATES PATENT OFFICE 2,097,994

INCANDESCENT SCREEN

Harry S. Bamford, Philadelphia, Pa., assignor to Farnsworth Television Incorporated, San Francisco, Calif., a corporation of California Application August 18, 1936, Serial No. 96,587

7 Claims. (Cl. 250—27.5)

My invention relates to an incandescent light source, and particularly to an incandescent image source for use in a cathode ray tube for television or related purposes.

Among the objects of my invention are: To provide a screen incandescently defining the trace of a cathode ray beam; to provide a screen which may be used to project an image defined by the trace of a cathode ray beam; to provide a screen incandescently defining the trace of a cathode ray beam without appreciable luminosity of the parts of the screen adjacent to the path of said beam; to provide a stable and long-lived heat screen of minimum mass; to provide such a screen mechanically strong enough to withstand the shocks and jars of ordinary usage; to provide a screen of mesh construction such that elemental areas thereof may be raised to incandescence by electronic impact; to provide an incandescible screen for cathode ray tubes in which the heat losses are almost entirely due to radiation; to provide a heat screen wherein elemental areas may be raised to incandescence without injuring the structure thereof; to provide a heat screen whereof the structural elements may expand and contract without injuring or grossly distorting the screen; to provide a heat screen of refractory material adapted to expand and contract without structural damage; to provide a cathode ray tube having a screen upon which an image may be produced with sufficient brilliance that the screen may serve as an image source for an external optical system; and to provide a cathode ray tube suitable for television or other use wherein a brilliant image is desired.

Other objects of my invention will be apparent or will be specifically pointed out in the description forming a part of this specification, but I do not limit myself to the embodiment of the invention herein described, as various forms may be adopted within the scope of the claims.

Referring to the drawing:

Figure 1 shows a schematic sectional view of a cathode ray tube connected for operation, with my incandescible screen shown, not to scale.

Figure 2 is a greatly enlarged plan view of a portion of my screen.

Figure 3 is a detailed sectional view not to scale of the structural elements of my screen.

A number of heat screens have been developed for television purposes, with the object of providing a brilliant light-image source suitable for projection through an optical system directly upon a viewing screen.

In Farnsworth application, Serial No. 655,784, filed February 8, 1933, entitled "Luminescent screen and method of use", there is disclosed and claimed a novel heat screen for use in a cathode ray tube wherein the screen is formed of a pile fabric or a very thin refractory sheet, positioned to be raised to incandescence by cathode ray impact; it is there indicated that the prevention of heat conduction in the screen itself is of prime importance, and that to the degree that heat losses can be limited to radiation, the spot undergoing electronic bombardment will become more brilliant, since the heat will be confined more closely to the area actually impacted by the cathode ray beam.

In the Farnsworth and Bamford application, Serial No. 20,158, filed May 7, 1935, entitled "Incandescent light source", and in the Farnsworth and Bamford application, Serial No. 20,159, filed May 7, 1935, entitled "Means and method of producing incandescent images", there are disclosed heat screens in which the losses are more closely limited to radiation, and new means are disclosed for solving the problem of elemental distortion under the expanding influence of the impacting ray. These applications disclosed knitted or woven screens of very fine refractory wire, reduced in cross-section by etching in acid, so supported that no straight strands extended between the screen-supporting members. The breakage of screen elements due to distortion was prevented, and the reduction of mass of the screen elements permitted a more brilliant image for a given beam power input.

A further development was presented in Farnsworth application, Serial No. 67,889, filed March 9, 1936, entitled "Incandescent light source", wherein the screen was formed of a great number of very small coils of very fine wire mounted with their longitudinal axes parallel and supported transversely at intervals. The lengthening of the path through which heat must travel to reach adjacent structural members effected a closer limitation of the heat loss to radiation alone, and the coil elements were free to expand and contract between their supporting wires without breakage or great distortion of the screen body.

In the present invention, I have formed an open mesh screen upon a comparatively rigid supporting frame, so constructed that the individual screen elements are entirely free to expand and contract, having a very long conducting path to the supporting structure so that heat loss from the screen elements may be limited almost entirely to radiation, and an elemental mass so small that a high degree of incandescence may be secured from a small beam power input; and have so arranged my screen that substantially all of the electrons forming the infalling beam will be collected by the elemental structure of the screen.

This screen is mounted within a cathode ray tube, in position to intercept a focused cathode ray beam, the intensity of which is varied in accord with a television or similar signal, and the position of which is controlled by saw-tooth oscillators in accord with principles now well known in the art. The screen is so positioned that the incandescent image traced thereon by the electron beam may be externally focused through a suitable lens system upon a screen or similar viewing means.

The more detailed description of my invention may be better understood by reference to the drawing. A generalized form of the circuit in which the heat screen is designed to operate is shown in Figure 1, wherein a cathode ray tube 1 having an envelope 2, of glass or similar material, shown in section, holds at one end a filament-type cathode 4 and a gun-type anode 5, and a grid 6 mounted therebetween, with suitable connecting and supporting leads sealed to the envelope 2. This arrangement of the cathode, grid, and anode to form an electron gun is purely conventional and any similar anode-cathode combination is satisfactory; all other means known to the art to produce an electron beam are deemed full equivalents thereof. When a positive potential relative to cathode 4 is placed on anode 5 by a battery 7, and cathode 4 is heated by a current source not shown in the figure, a stream of electrons is emitted by said cathode, and attracted toward said anode.

The number of such emitted electrons reaching anode 5 is controlled by the intensity of the charge placed on grid 6 by the signal current led thereto by lead 9. Of the controlled number of electrons reaching the gun-type anode 5, a considerable portion pass therethrough, and the beam thus produced moves toward the schematically shown screen 10 placed to intercept it. The beam is focused to a desired size by a solenoid 11 surrounding the tube 1, energized by battery 12, and the strength of the focusing field is controlled by resistor 14. The focused beam is caused to traverse the screen 10 in accord with principles well known in the art by saw-tooth oscillators 15 and 16 connected to field coils 17 and 19 respectively.

Screen 10, the detailed construction of which is shown in Figures 2 and 3 is supported obliquely to the axis of tube 1 by a member 20 which also serves to place on said screen 10, a positive charge obtained from battery 7 through a lead 21.

The impact of the electron beam on screen 10 raises the elemental areas thereof to incandescence at the point of contact, and as the entire surface of the screen is traversed by the beam, a visual image is formed thereon, which is projected through the envelope 2 of tube 1, and may be externally focused by an optical system 22, shown schematically, to produce an image 24 upon a screen or other desired surface, not shown in the drawing.

The details of construction of screen 10 are shown in enlarged form, in Figures 2 and 3. The screen itself is composed of a dense mat of very fine helices 25 of extremely fine refractory wire, such as tungsten. I prefer to form helices 25 by winding about twelve hundred turns per inch of wire having a diameter less than .001" upon a mandrel of diameter less than .003".

Each helix has a number of turns such that its length is greater than its diameter, and is terminated at one end by a short straight segment 26 parallel to the axis of the coil. A row of helices is assembled by spot welding the straight segment 26 of each coil 25 to a strip 27 of suitable length, formed of conducting material such as steel, with the axes of the helices parallel, and the coils so spaced as to be in contact with each other. A number of such strips are assembled, with spacing strips 29 therebetween, of size such that the corresponding helices of adjacent rows are in contact. This assemblage of strips is then fixed together by suitable clamps, bolts, or welds, not shown in the figures. The mass of the individual elements may be then reduced by cleaning and etching in hot sodium nitrite, a process described in the three applications last cited above, until the diameter of the tungsten wire is .00025". The individual helices are now free to expand and contract without restriction by or interference with adjacent coils, and there will be no breakage due to such expansion. It is apparent that since the supporting bed or framework offered by strips 27 and 29 is comparatively rigid, any stress introduced by heating of the individual coils 25 will merely result in a change in the length or diameter of such coils.

The completed screen is mounted upon supporting member 20 at an angle to the tube axis that an incandescent image formed thereon may be projected through envelope 2 to focusing system 22.

Due to the oblique position of the screen relative to the beam from gun 5, it is apparent that practically all of the electrons in the beam will be collected by the helices, assisted by the attracting potential placed thereon by battery 7. All of the energy of the beam, therefore, is utilized in raising the screen elements to incandescence. In order, however, that the beam power may be most usefully applied, the screen may be polarized by irradiation with infra-red rays, or by directing upon it an unmodulated, unfocused stream of electrons, whereby the entire screen may be raised to a barely visible red glow, and the whole energy of the modulated beam may be used in producing visible variations in image detail. This procedure is fully explained in the co-pending Farnsworth application, Serial No. 65,784, cited above.

My screen is so proportioned that a number of helices will be impacted by the cathode ray beam for each element of the reproduced image, and an intense light source, sharply defined, and modulated in accord with the light intensity of the corresponding element of the image to be reproduced, is available for projection. It is obvious that due to the oblique position of the screen 10 relative to the cathode ray beam, "keystoning" will occur, producing a distorted image, if the scanning circuits are not properly adjusted to counteract this effect. Methods of overcoming this tendency are well known to those in the art, and have been completely described in earlier Farnsworth patents; since they form no part of the present invention, they will not be further described.

It will be understood that I may vary the position of the screen, the design of the gun, the exact location of various parts, etc., these all being mere mechanical details. The material of which the screen is formed, its elementary dimensions, the method of assembly, and the means for reducing the mass of the screen elements are all susceptible of variation within the scope of the claims.

I claim:

1. A cathode ray tube having an incandescible screen therein composed of a plurality of closely mounted helices of very fine tungsten wire having their axes parallel, and normal to the plane of said screen.

2. In combination with an envelope containing an anode and a cathode cooperating to produce an electron beam, a target positioned in the path of said beam comprising a plurality of adjacent axially parallel helical coils of refractory wire fixed in and normal to a supporting plate.

3. In combination with an envelope containing an anode and a cathode cooperating to produce an electron beam, a target positioned in the path of said beam comprising a plurality of helical coils of refractory wire of substantially twelve hundred turns per inch, said coils being parallelly mounted, at separation equivalent to two hundred fifty coils per inch, by one end upon and axially normal to a supporting plate.

4. In combination with an envelope containing an anode and a cathode cooperating to produce an electron beam, a target positioned in the path of said beam comprising a plurality of helical coils of refractory wire of substantially twelve hundred turns per inch, said coils being parallelly mounted, at a separation equivalent to two hundred fifty coils per inch, by one end upon and axially normal to a supporting plate conducting strip, a plurality of said coil supporting strips being fixed parallel to each other at a distance equivalent to a spacing of two hundred fifty coils per inch.

5. In combination with an envelope containing an anode and a cathode cooperating to produce an electron beam, a target positioned to intercept said beam, comprising a plurality of adjacent, axially parallel helical coils of tungsten wire having a diameter substantially .00025" mounted by one end upon and axially normal to a plurality of supporting strips, and having a number of helices substantially greater than the number of elements in the image desired.

6. In combination with an envelope containing an anode and a cathode cooperating to produce an electron beam, a target positioned to intercept said beam, comprising a plurality of adjacent, axially parallel helical coils of tungsten wire having a diameter substantially .00025" mounted by one end upon and axially normal to a plurality of supporting strips, and having a number of helices substantially greater than the number of elements in the image desired, said target being positioned with the axes of said coils at an angle to said screen.

7. In combination with an envelope containing an anode and a cathode cooperating to produce an electron beam, a target positioned to intercept said beam, comprising a plurality of adjacent, axially parallel helical coils of tungsten wire having a diameter substantially .00025" mounted by one end upon and axially normal to a plurality of supporting strips, and having a number of helices substantially greater than the number of elements in the image desired, said target being positioned with the axes of said coils at an angle to said screen, and means for viewing said screen along light paths substantially parallel to the axes of said coils.

HARRY S. BAMFORD.